United States Patent [19]

Masson et al.

[11] Patent Number: 4,908,850

[45] Date of Patent: Mar. 13, 1990

[54] VOICE SERVICES NETWORK WITH AUTOMATED BILLING

[75] Inventors: Ronald K. Masson, Topanga; Michael W. Edelson, Simi Valley, both of Calif.

[73] Assignee: American Communications & Engineering, Inc., Simi Valley, Calif.

[21] Appl. No.: 142,676

[22] Filed: Jan. 11, 1988

[51] Int. Cl.$^4$ .................. H04M 3/50; H04M 3/56; H04M 3/58

[52] U.S. Cl. .................. 379/88; 370/62; 379/89; 379/91; 379/204; 379/212

[58] Field of Search ............ 379/88, 67, 77, 84, 379/97, 91, 204, 212; 370/62

[56] References Cited

U.S. PATENT DOCUMENTS

| | | | |
|---|---|---|---|
| 4,071,698 | 1/1978 | Barger, Jr. et al. | 379/84 |
| 4,489,438 | 12/1984 | Hughes | 379/88 |
| 4,649,563 | 3/1987 | Riskin | 379/97 |
| 4,663,777 | 5/1987 | Szeto | 379/88 |
| 4,716,583 | 12/1987 | Groner et al. | 379/88 |
| 4,757,267 | 7/1988 | Riskin | 379/113 |
| 4,766,604 | 8/1988 | Axberg | 379/67 |
| 4,792,968 | 12/1988 | Katz | 379/92 |
| 4,827,500 | 5/1989 | Binkerd et al. | 379/88 |

OTHER PUBLICATIONS

"Merlin Voice Mail VM600", C. R. Newson, *British Telecommunications Engineering*, vol. 4, Apr. 1985, pp. 32-35, [379-89].
"Emerging Telecommunications Needs of the Cord Industry", pp. 26-31, S. B. Weinstein, *IEEE Communications Magazine*, vol. 22, No. 7, Jul. 1984, [379-91].
"Telephone Voice Synthesis Systems", A. S. Yatagai, *Telecommunications*, Aug. 1985, pp. 56h-l, 68, [379/89].
"Conversant 1 Voice System: Architecture and Applications", R. J. Perdue et al., *AT&T Technical Journal*, vol. 65, No. 5, Sep./Oct. 1986, pp. 34-47, [379/88].

*Primary Examiner*—Thomas W. Brown
*Attorney, Agent, or Firm*—Blakely, Sokoloff, Taylor & Zafman

[57] ABSTRACT

An information network and method for providing a nationwide audio text network, including electronic billing, useful for a wide variety of applications is disclosed. The information network utilizes a telephone message delivery system coupled to phone lines, typically the "800" area code common carrier lines, to receive incoming calls, to interactively respond thereto as controlled by a computer and to communicate with the computer to provide information to and obtain information from a database maintained by the computer. In addition to being coupled to the telephone message delivery system, the computer is typically also coupled to one or more dedicated or dial up lines so as to be capable of obtaining electronic credit card authorization or changes, and is further coupled so as to control the routing of an incoming call, to redirect the call to a live operator or to other equipment, or to outgoing lines to any desired destination.

56 Claims, 6 Drawing Sheets

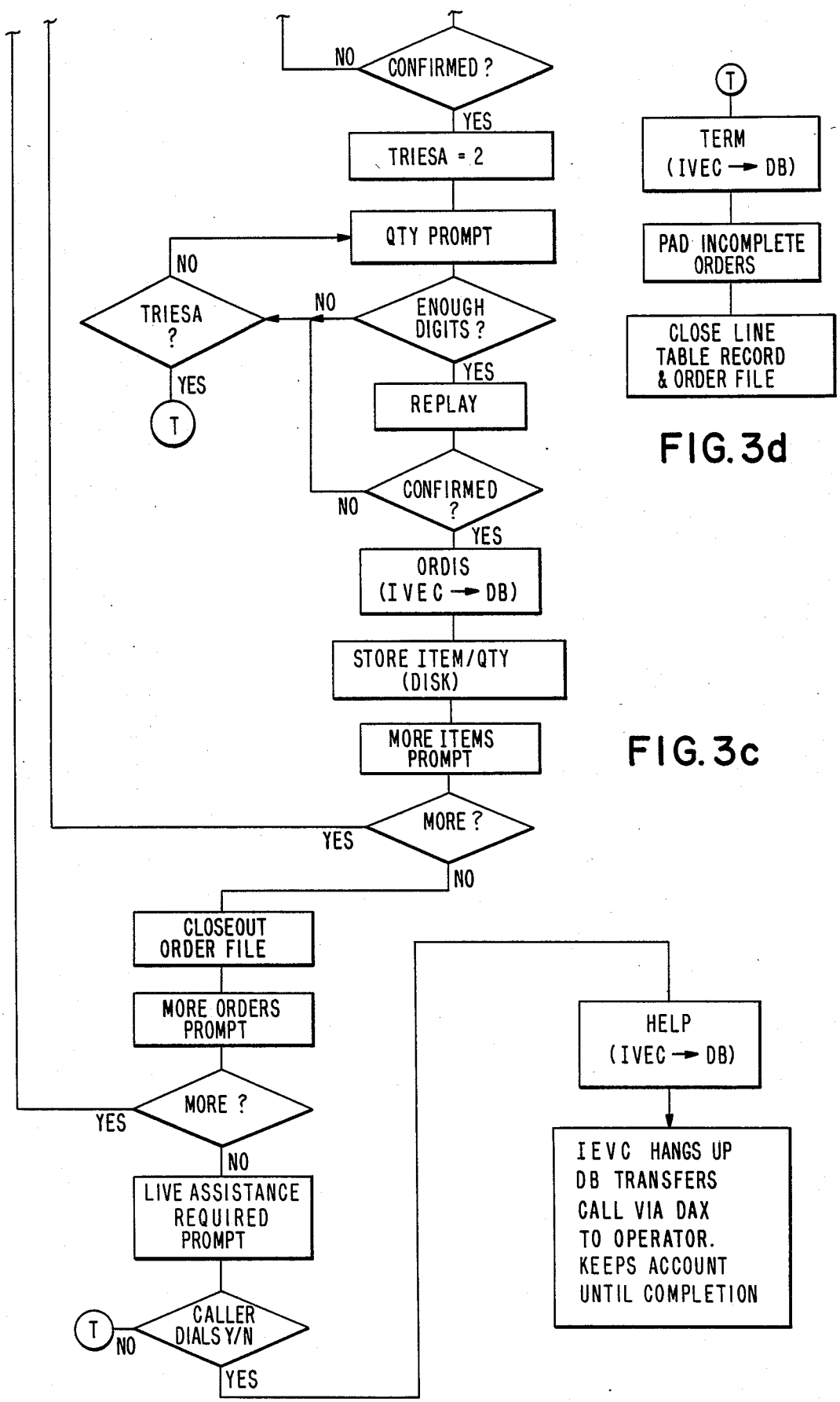

VOICE SERVICES NETWORK WITH AUTOMATED BILLING

BACKGROUND OF THE INVENTION

1. Field of the Invention.

The present invention relates to the field of information and business systems.

2. Prior Art.

In recent years various technologies have been developed to ease various aspects of communications and business activities. In general, these developments have related to the reducing of costs, and/or the at least partial automating of functions previously done manually to increase the speed and accuracy with which these functions may be accomplished. Described hereinafter are certain of these developments relating to and forming prior art relevant to the present invention.

The Assignee of the present invention currently manufactures and sells an interactive voice exchange computer (IVEC) which plays messages over telephone lines. The system uses a digital computer and enhanced digital speech technology to record and play back natural speech and music with a clarity approaching that of the original sound. A single such system can deliver multiple messages to multiple telephone lines for multiple information providers, independently and simultaneously. It can, for example, answer up to 52 lines on the first ring, respond to one or more touch tone digits dialed by callers, then select and play a sequence of one or more common or unique messages in a pattern depending upon what was dialed. Up to eight completely independent information services can coexist on the same system, with each of the eight playing a simple message or a different complex pattern of messages with any combination of common or unique parts, such as introductions, spots, transitions, tags, and optional fill-ins. If desired, individual spoken worlds may even be selected automatically or by a data link inserted into the message stream to create detailed time, weather and quote services.

All of the messages on the IVEC system may be rerecorded on sight or remotely from any touch tone telephone while the system stays on line answering calls. Different passwords protect each provider from unauthorized updating. The system also keeps separate comprehensive accounting data for each provider, including a grand total, a resetable total, individual line totals, hourly totals and caller choice totals. All of the totals may be obtained on sight or remotely in spoken words and numbers from any touch tone telephone As with updating, different passwords protect each provider from unauthorized access. The system, when fully configured, consists of an IBM AT with the PC DOS operating system, appropriate software, keyboard, CRT display, power line conditioner, one or more four line interface circuit boards and one or more conferencing boards installed either in the computer cabinet itself or in an expansion cabinet.

Also known are credit card services for the verification of credit cards and for the actual charging against a credit card account over phone lines without operator intervention. Such systems generally utilize a credit card reader at the point of sale, together with a numeric keyboard and display for entering the amount to be charged, with all communications between the point of sale and the credit card database being in the form of data communications using either a dedicated line or a conventional telephone line.

Also commonly used y businesses are the so-called "800" area code toll free lines. An 800 number may be called from anywhere in the country on a toll-free basis, with the company having the 800 number paying for the use of the line on a time basis or time-distance basis. Such lines provide a convenient way of allowing customers and prospective customers to call a business from anywhere in the country without either having to pay for the call or alternatively, calling collect, considering the relatively low rates charged for use of an 800 number line, also provide cost savings over conventional long distance service even for outgoing calls.

One of the objects of the present invention is to integrate and enhance these various technologies into a single integrated and versatile system for providing nationwide, a broad variety of capabilities suitable for a wide range of business and communications applications and requirements.

BRIEF SUMMARY OF THE INVENTION

An information network and method for providing a nationwide audio text network, including electronic billing, useful for a wide variety of applications is disclosed. The information network utilizes a telephone message delivery system coupled to phone lines, typically the "800" area code common carrier lines, to receive incoming calls, to interactively respond thereto as controlled by a computer and to communicate with the computer to provide information to and obtain information from a database maintained by the computer. In addition to being coupled to the telephone message delivery system, the computer is typically also coupled to one or more dedicated or dial up lines so as to be capable of obtaining electronic credit card authorization or charges, and is further coupled so as to control the routing of an incoming call, to redirect the call to a live operator or to other equipment, or to outgoing lines to any desired destination. Thus the system may be used for a variety of applications ranging from simple information dissemination to automatic order entry with credit verification or charges, and as a fully automated system without operator intervention or with as much operator intervention as desired for taking information such as addresses not readily remotely enterable to a touch tone keyboard and for assisting in special circumstances. Typical exemplary applications are disclosed.

DETAILED DESCRIPTION OF THE INVENTION

Figure 1:
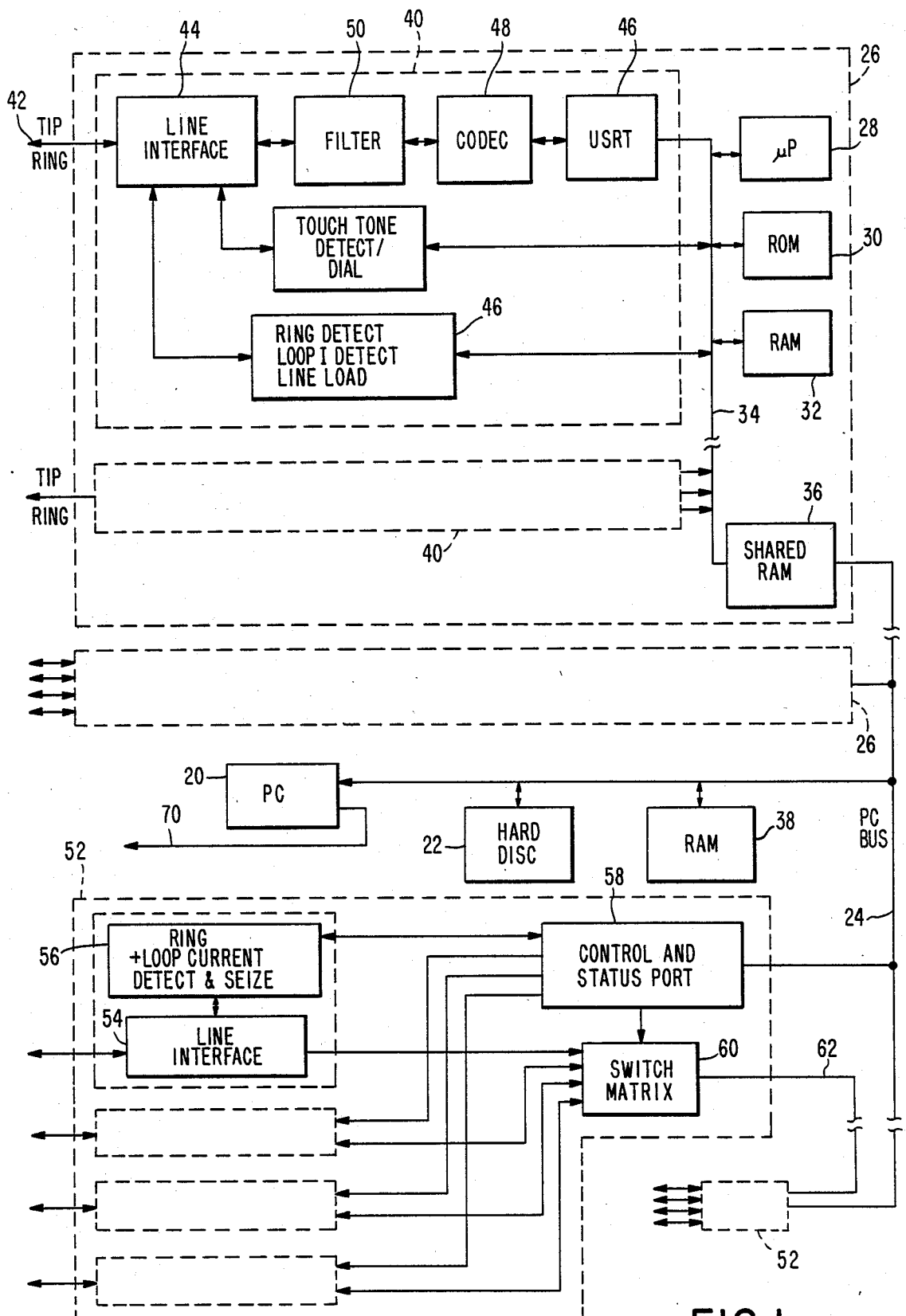
FIG. 1 is a block diagram of a typical IVEC system.

The present invention system utilizes as a key element the preexisting IVEC system. Accordingly, it is believed best to first describe that system, both in terms of its organization and function, so that thereafter a better understanding of the present invention system and the function of the IVEC system therein may be had. Thus, first referring to FIG. 1, a block diagram of a typical IVEC system may be seen. In hardware configuration, such a system is comprised of a personal computer 20, such as an IBM AT Personal Computer having a hard disk 22 for bulk storage coupled thereto and having a plurality of printed circuit boards coupled to the bus 24 thereof, either being directly inserted into the PC or into an expansion chassis therefor.

One typical board in the IVEC system, referred to as the X4 board, is shown within the phantom enclosure 26. On each such board is a microprocessor 28, specifically a Z80 with associated ROM 30 for permanent storage of the Z80 operating program and RAM 32 for temporary storage of data to support the operating program of the microprocessor, speech data and basic control information. Connected to the microprocessor bus 32 is a shared RAM 36 which in turn is directly connected to the bus 24 of computer 20 and occupies common address space with both the X4 board microprocessor 28 and the IVEC PC 20. The shared RAM is switched back and forth between the PC address space and the microprocessor space to provide data flow therebetween. Both run at full speed without sharing cycles, arbitrating for the bus, etc. Digitized voice information, generally available on the hard disk 22, is transferred as desired to RAM 38, actually comprising one or more memory boards plugged into and within the address space of the computer 20. This digitized voice information is passed to the microprocessor RAM 32 through the shared RAM 36 effectively at real time rates so that each X4 board only stores 32 bytes of digitized voice data per phone line at any one time.

Coupled to the Z80 microprocessor bus 34 on each X4 board are four telephone line interfaces, a typical one being shown in block diagram form within the phantom line enclosure 40. Each interface is coupleable to the tip and ring lines 42 of a standard telephone line through a line interface 44. This interface provides sensing of the open telephone line to detect ring signals through the ring detect circuit 46, which also controls the line interface to controllably seize a phone line by putting the conventional line load thereon, and to detect the telephone line loop current and the absence thereof to release the lines 42 for subsequent calls when the calling party's line goes back on hook before the IVEC completes its tasks and itself initiates the termination process. Also coupled to the line interface 44 is a touch tone control circuit which, through appropriate microprocessor 28 control, can dial an outgoing call or alternatively, can detect touch tone codes entered through the touch tone keypad of a caller's telephone, once the line connection has been established. This capability is essential to the present invention, as it is the ability of the IVEC system to receive numeric information and simple alpha information (Y for yes, N for no, etc.) that allows the system to automatically communicate with a caller for order entry and like functions.

Digitized audio put out by the IVEC system for transmission over the phone lines 42 is coupled from bus 34 through a universal synchronous receiver transmitter 46 (USRT) to a CODEC 48 which converts the digitized audio to an analog signal. This analog signal is filtered by a filter 50 and coupled to the phone lines 42 through the line interface 44. In general in an IVEC system, these functions are bilateral in that incoming audio (analog) signals can be converted through CODEC 48 to digital signals and coupled through the receiver transmitter 46 to bus 34 for recording (storing in memory) as desired. While in some applications of the present invention this capability of the IVEC system may not be used, in others it serves a key function. By way of example, in the automated order entry system hereafter described, drop ship addresses are entered this way.

A typical X4 board having microprocessor 28, ROM 30 and RAM 32, has four line interfaces 40 coupled to the microprocessor bus 34. In turn, up to 13 such boards L providing a 52 line capability may be plugged into an expansion chassis for the bus of personal computer 20. In addition, the IVEC system may include one or more conferencing boards 52. A typical conferencing board includes four phone line connections, each through an appropriate line interface 54 having ring and loop current detect and seize circuitry 56 coupled thereto, and controlled through a control and status port 58 on the bus 24 of the personal computer 20. Each line interface 54 is coupled to a line switch matrix 60 and also controls of the control and status board 58 to connect any of the four lines on the conferencing board 20 line of an audio bus 62. The audio bus is a multiple line bus interconnecting up to six conferencing boards 52, to allow connection of any incoming line to any one of the six conferencing boards to any other line or lines of any of that same group of conferencing boards.

Finally, PC 20 is also provided with a serial I/0 line 70, the use of which will depend upon the specific application. In general, this serial I/0 line is not used for digitized voice, but rather for more general communication with the system, in the present invention to communicate with the database computer. Thus it may be seen from FIG. 1 that the only connections of the IVEC system to the "outside" world, other than power, are the phone line connections and the serial line 70, with the IVEC system itself having the capability of receiving calls, of making calls, providing voice information and/or instructions over the phone line, of receiving touch tone coded information over the phone line and of providing a serial output as desired.

Figure 2:
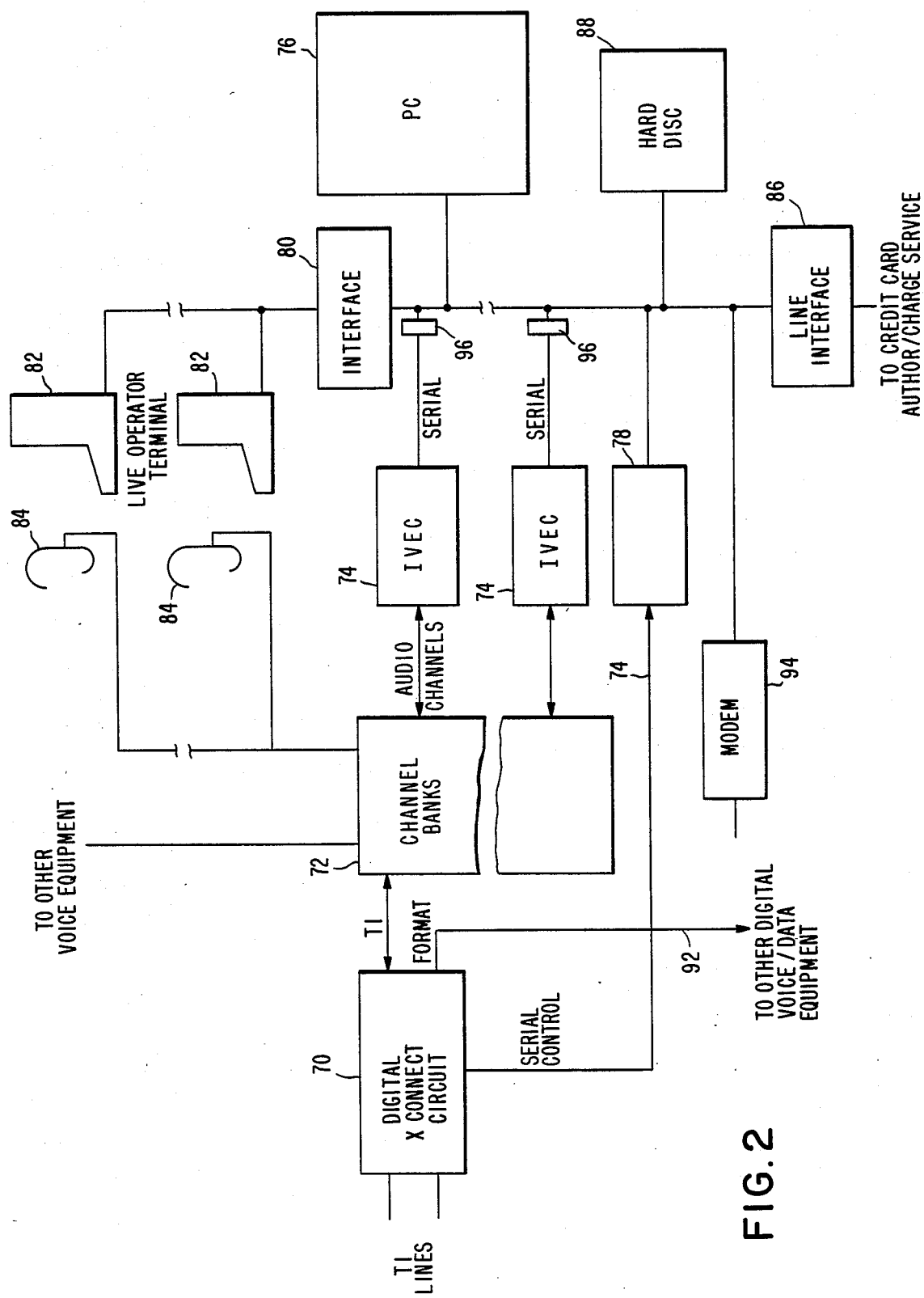
FIG. 2 is a block diagram of a typical embodiment of the present invention Information Network.

Now referring to FIG. 2, a block diagram of the system of the present invention may be seen. The system is built around the interactive voice exchange computer (IVEC) hereinbefore described with respect to FIG. 1. As may be seen in FIG. 2, one or more T1 telephone lines are coupled to the system through digital crossconnect system 70. The T1 telephone line is one form of telephone service provided by the telephone companies, and comprises 24 telephone channels in a time shared digital signal format, each on two wire pairs, one pair for transmit and one pair for receive. The digital crossconnect system 70, sometimes referred to as a DAX, is a digitally controlled system for connecting any channel of any T1 line connected thereto to any other channel of any T1 line connected thereto, whether the same or a different T1 line. Thus, with half the T1 line connections of the digital crossconnect circuit coupled to T1 telephone lines and the other half coupled to channel banks 72, the signals on the incoming T1 line may be rearranged in any manner desired for presentation to the channel banks by control of the digital crossconnect circuit 70 through the serial control line 74, as coupled to the bus to a personal computer 76 through a parallel to serial converter 78. The computer 76 in the preferred embodiment is an IBM AT personal computer, as is used in each IVEC system itself.

The channel banks 72, well known in the telephone art, convert signals in the Tl format to individual audio telephone channel signals and vice-versa. Such conversion is a conversion not only of the audio signal but also includes the conversion of the supervision and signaling signals, such as ring signals, touch tone signals, line voltage and currents, etc., characteristic of standard telephone signals. Accordingly, the output of the channel banks 72 to the IVECs 74 are conventional telephone line signals and accordingly, the fact that the Tl lines rather than the more conventional individual tip and ring lines have been used is transparent to the IVEC systems. Obviously, for each Tl line into the crossconnect circuit 70, one Tl format line will be connected from the output thereof to the channel banks 72, with the output of the channel banks to the IVEC systems being as many as 24 individual tip and ring line pairs. Multiple lines are not shown in FIG. 2 because of the relatively large numbers thereof, though it should be understood that more than one Tl line may be connected to the digital crossconnect circuit 70, resulting in more than one Tl format line coupled to the channel banks 72, with a relatively large number of tip and ring line pairs normally being coupled between the channel banks and the IVECs 74. As stated before, such a typical IVEC system can handle 52 lines. The addition of one or more further IVEC systems can therefore very substantially raise the line capacity of the system. As shall subsequently be seen, the computer 76 can only adequately manage a limited number of IVEC systems, depending upon the specific tasks being managed, though it should be understood that the entire system shown in FIG. 2 may be replicated as desired for almost unlimited capacity. Similarly a system may use less than a full Tl line into an IVEC, dependent on the needs of the system.

Also coupled to the bus of the computer 76 is an interface 80 coupled to one or more terminals 82, manned by operators who can interact with the caller and with the computer 76 to assist in entering data to the computer via the terminal by voice communication with a caller when the data, such as mailing address, is not readily enterable through the caller's touchtone keypad, or for that matter, assisting the caller and/or the computer for any purpose when the two do not seem to be communicating as intended, such as the failure of a caller to enter any touch tone information when requested by way of a verbal prompt. (This feature is also used in the system to be described). For this purpose a number of lines coming out of the channel banks would be connected to operator headsets 84, typically in a manner to automatically provide an off hook signal on the respective lines to the channel banks, so that when a line was switched from one of the IVEC systems to an operator via control of the digital crossconnect circuit 70, the line would be automatically held as the respective operator was signalled to proceed with the call by a computer 76 through the terminal.

Also connected to the bus of computer 76 is an appropriate line interface 86 coupled to either a dedicated line or a conventional telephone line for automatically calling and communicating with a credit card verification service. For this purpose, the computer 76 effectively acts as the typical small point of sale credit card verification terminal, and to that extent, is fully transparent to the credit card authorization service. Of course also connected to the bus of the computer 76 is a hard disk 88 for bulk data storage, typically in a data base form for maintaining order accounts, credit card verifications, etc., as appropriate for the system in accordance with its particular use.

While the system as just explained is essentially fully configured, there may be occasions when it is desired to connect other equipment to the system. For this purpose, other voice equipment such as, by way of example, voice mail equipment may be coupled to the channel banks through lines 90 directed to such equipment instead of the IVECs 74, or alternatively, other digital voice/data equipment may be coupled to one or more of the Tl format lines 92 from the digital crossconnect circuit 70.

Having now described the general structure of the present invention, its operation is perhaps best explained by illustrating typical examples of its use. Consider first use of the system as an order entry system for a hypothetical distributor who maintains open accounts with his customers. In this case the data base maintained by personal computer 76 and hard disk 8 contains active account numbers against which callers are qualified. Callers are permitted to enter multiple purchase orders each with multiple line items, and to leave a spoken message for special drop shipment information. The database builds a flat order file which is downloaded to a remote printer through the dialup modem 94 coupled to the bus of the personal computer 76.

Figure 3A:
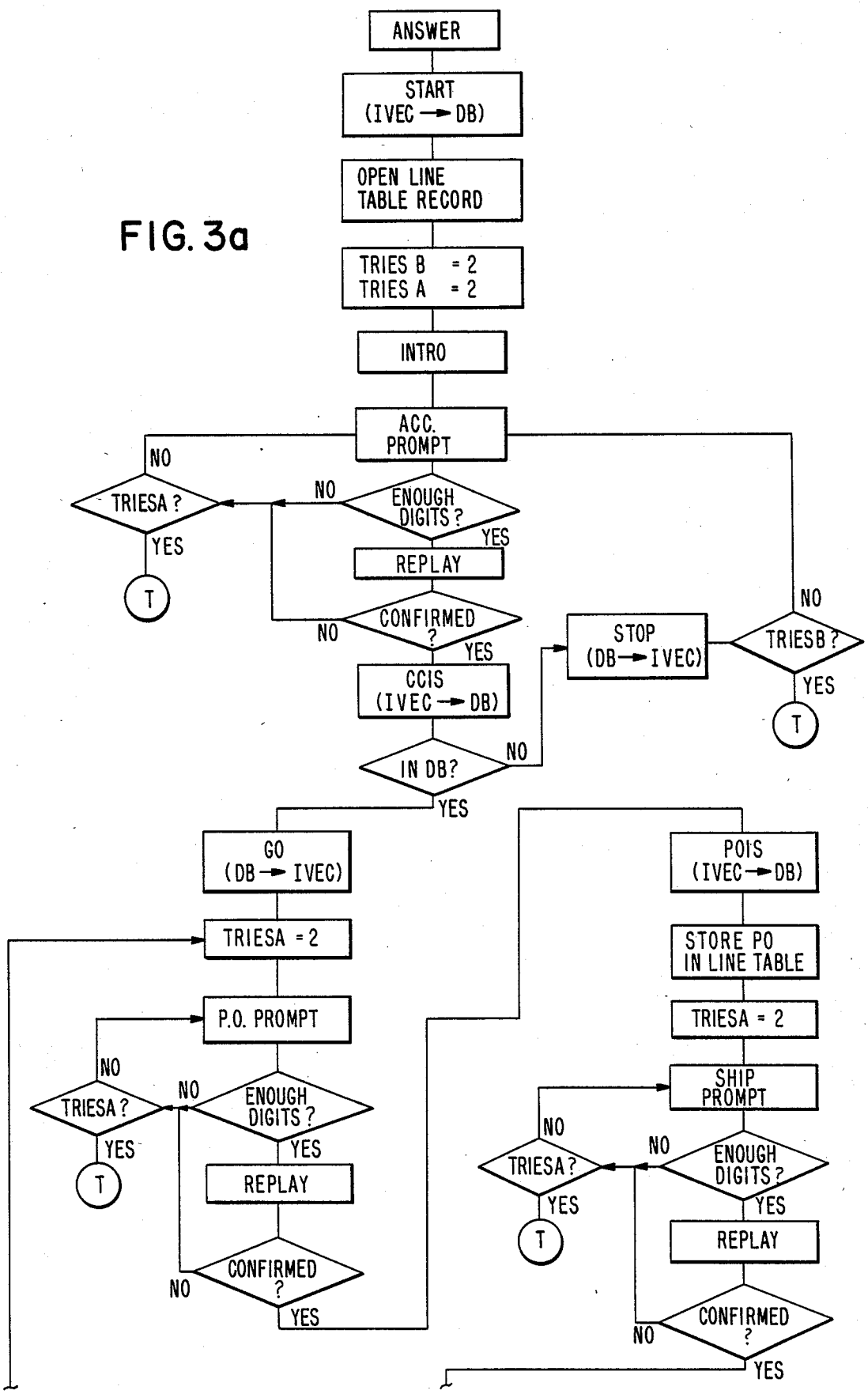
FIG. 3 is a logic flow diagram for a typical automated order entry system utilizing the present invention, of which FIGS. 3a, 3b and 3c comprise individual parts of the diagram and FIG. 3d comprises a generalized termination flow diagram used therein.
Figure 3B:
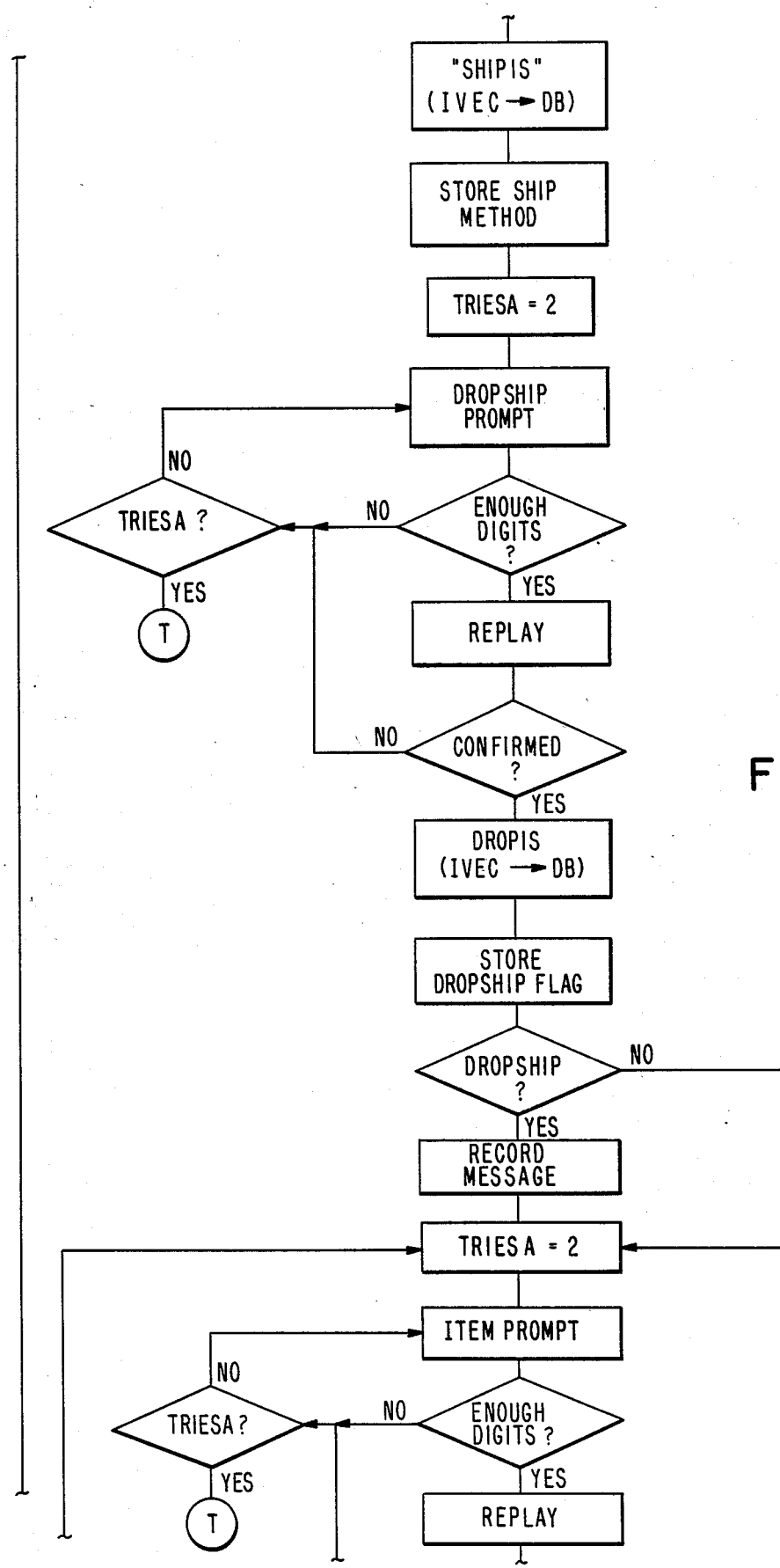

The actual operation of the system proceeds in accordance with the logic flow diagram of FIG. 3. In the quiescent state, the digital crossconnect circuits 70 connect the signals on the Tl lines through the channel banks 72 to the IVECs 74, which have been initialized in the usual manner by the corresponding PC 20 (FIG. 1) of each respective IVEC to contain the appropriate digital speech data for handling incoming calls. As indicated in FIG. 3, an incoming call is answered by the respective IVEC 74 assigned to that line, so that the call is answered with the appropriate verbal greeting At the same time the IVEC communicates through its respective serial line and the serial to parallel interface 96 with the computer 76, causing the same to open a line table record to track the progress of a call. Each record is identified by IVEC machine, user and line numbers. Thereafter TRIESA and TRIESB are both set equal to 2. TRIESA and TRIESB are IVEC parameters representing the number of times communication between a caller and the IVEC, and the IVEC and the database respectively, will be attempted before a call is automatically terminated.

The next step, which of course is substantially immediately upon answering the line, is to provide an appropriate introduction or greeting to the caller such as "Thank you for calling our Automatic Order Entry System" etc. Thereafter the IVEC system will provide a verbal prompt to the caller requesting that the caller's account number be provided through the touch tone system. If the caller does not enter enough digits within a predetermined length of time, TRIESA is decremented and the account number prompt repeated to reinitiate the account number entry by the caller. If the proper number of digits are entered within the allotted time the account number is played back to the caller for confirmation purposes, in response to which the caller enters a Y or an N from his touch tone system to confirm the number read back, or alternatively, to decrement TRIESA and to reinitiate the account number prompt for reentry of the account number. Note that if on decrementing TRIESA the same goes to zero, either upon failure to enter the correct number of digits within the given time or failure to confirm the number so entered, the call is automatically terminated ("T" in FIG. 3). On termination not only is the call terminated, but the fact thereof is also communicated to the database by the IVEC system which closes out the order to salvage any incompletes, and computes the service charge to the user (the distributor in the example) which in turn will depend upon the duration of the call. Such information is carefully stored to assure against loss of significant information in the event the system goes down for any reason.

For prompt confirmation of the validity of the account number, the IVEC provides a CCIS ("credit card is") signal to the database identifying the account number thereto. In the event the database does not have an entry for that account number, the database computer signals the respective IVEC to stop, after which TRIESB is decremented and tested. TRIESB is then still nonzero, the IVEC will again signal the caller with the verbal account number prompt to proceed with another try at entry of a valid account number by the caller. If on the other hand TRIESB now equals zero e.g. the allotted number of tries have already occurred, the call is terminated through the call terminating procedure hereinbefore described.

Assuming that the account number entered is a valid account number as verified by finding the same in the database, the database computer provides a GO command to the IVEC. TRIESA is then reset to 2 and a purchase order number prompt is verbally provided by the IVEC to the caller. The routine for entering and confirming the entry of the purchase order number essentially replicates the routine hereinbefore described with respect to the entering of the account number, the verbal prompts from the caller to the IVEC being altered accordingly so that there is no misunderstanding that it is the purchase order number which is being requested. Upon confirmation of the number, a purchase order signal POIS is provided from the IVEC to the database to store the purchase order in the line table set up therefor. Since multiple items may be ordered on the same purchase order, this purchase order number must be retained until a call is terminated or until a new purchase order number is entered. Thereafter TRIESA is again reset and the next entry routine is executed, specifically to input the shipping method. Again this routine, except for the verbal prompt contents, is substantially the same as the purchase order number entry routine resulting in a SHIPIS signal from the IVEC to the database computer to store the shipment method.

As before, after storing the shipment method TRIESA is again reset and a similar dropship routine is executed to determine whether the shipment is to be dropshipped, with the dropship flag ultimately being stored upon successful execution of this routine. Obviously as shown in FIG. 3, if any of these entry routines failure to obtain the requested information within a given time or to confirm information put in by the caller within a given number of tries, the same will result in the termination of the call, though in general, as previously mentioned, such data or partial data will be stored and can be manually reviewed if appropriate. If the order is to be dropshipped, the shipping address will generally be required. Since a full alphanumerical keyboard is not available on a conventional touch tone telephone, entry of addresses previously not within the database cannot readily be done on the touchtone system. Thus for this purpose, the respective IVEC will switch to a recording mode to accept the incoming shipping address in audio form, digitize the same by CODEC 49 (See FIG. 1) and store the same in memory and ultimately in the disc system of the IVEC. While not shown in FIG. 3, even the verbal information with respect to shipping address can be verified using the appropriate prompts by playing back the verbal message and asking perhaps first is that shipping information correct (Y or N) and then further asking if there is any other shipping information that the caller would like to provide, which might illicit afterthoughts such as a zip code or a particular person to whom the shipment should be directed, etc., again with the playback for verification purposes if desired.

Thereafter, as may be seen in FIG. 3, TRIESA is reset and an item identification (part number or the like) is entered, followed by a further resetting of TRIESA and entry of the quantity ordered. Thereafter an ORDIS signal is sent from the IVEC to the database providing the item identification and the quantity ordered thereto, with the same then being stored on disk. The purchase order number and shipflags are retained in memory, however, awaiting a determination as to whether more items are to be ordered on that purchase order. When the response to the more items prompt is affirmative (Y), the system loops back for execution of the routines to obtain the additional item identification and quantity, looping through these routines for as many additional items as the customer chooses to order on that purchase order. When the purchase order is completed, as indicated by a negative response to the more items prompt, the IVEC sends a TERM signal to the database computer which then closes out the order. At this time the database computer also computes the charge to the account of the distributor taking the order, which charge will depend upon the duration of the call. This information too will be stored on disk, typically with all information being printed out periodically or backed up appropriately to avoid inadvertent loss for any reason. Upon the closing of a particular order the caller will be queried as to whether additional orders are to be entered, with the system looping back to the purchase order prompt if the answer is affirmative or proceeding with a prompt to determine if live operator assistance is desired. Live operator assistance may be required for a wide range of reasons not readily addressable with predetermined prompts. By way of example, live operator assistance may be desired for providing additional information regarding the order, such as to point out that the order is entitled to a special discount, or is a no change order to replace product being returned, etc., or to communicate related information, such as to request that a new catalog be sent, that installation instructions be included with the order or that a salesman be requested to call regarding a quote for a similar order in a custom color, etc. If the live operator assistance prompt is answered negatively, the IVEC terminates the call with an appropriate verbal message and then initiates the termination sequence. If the live operator prompt is answered affirmatively, the IVEC verbally acknowledges the request and sends a HELP message to the data base computer, which transfers the call to an available operator terminal by appropriately switching the digital cross connect circuit, and the IVEC hangs up. The live operator terminal is effectively off hook all the time, so that the call is immediately retained upon switching. The data base computer will provide sufficient information to the operator terminal so that the operator may answer the call on an informed basis, and add to, alter or attach special messages to the order or record separate messages for subsequent action as requested by a caller.

Note that in general the decision points and verbal prompts are handled by the IVEC systems themselves, and do not depend upon communications from or with the database computer, as the IVECs have the ability to provide outgoing verbal messages, to receive and interpret incoming touch tone signals, to make decisions based thereon, and to record incoming verbal messages, as well as to format such information once properly gathered for transfer to database computer in a form readily recognizable thereby. For this reason the database computer is not heavily utilized in servicing any one call, and thus can serve and support many IVECs as well as having time to provide the database information for each account at remote locations as appropriate. For this purpose one or more modems 94 are connected to the database computer 76 for communicating in the same digital form over the phone lines. This allows a user of the information network, such as the distributor in the example described, to call and identify itself and to receive in data format all new orders entered. With respect to any message stored as digitized speech, such as a shipping address, such speech messages are kept in the corresponding IVEC system. Instead the customer (in this case the distributor) listens to it by calling the special "update line" on the IVEC, (the same line which is used for rerecording messages remotely, obtaining verbal call accounting data, etc.) and entering his security code and message number, as shown in the order record which he has obtained from the database. (Provisions for review and deletion already exist on the IVEC update line.) This allows the communication of the voice information in this communication link without degradation, and the user of the system to play back the audio information as many times as desired as may be required for the transcription thereof without tying up the database computer 76 of the present invention system.

Of course the distributor example of FIG. 3 is merely one example of possible uses of the present invention of the type wherein the provider of the "service" pays all costs associated with use of the system. Other examples include the dissemination of product safety bulletins, product updates and the like, in effect any type of information and/or advertising dissemination wherein the economic balance, incentives or requirements justify the information provider rather than the information consumer pay the costs associated with the information dissemination.

Figure 4:
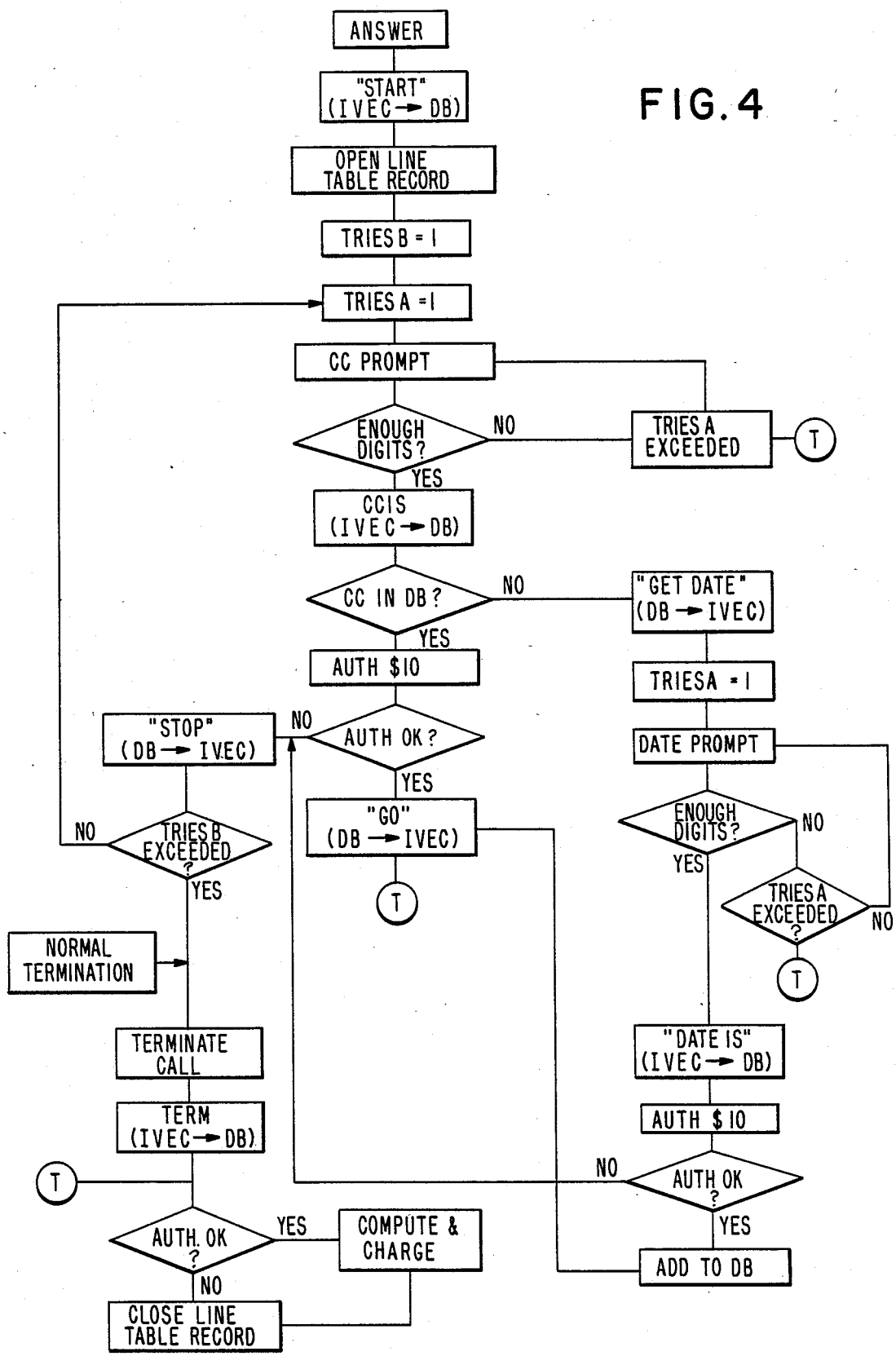
FIG. 4 is a logic flow diagram illustrating another typical use of the present invention system by an information provider.

Now referring to FIG. 4, the logic flow diagram for another exemplary application of the present invention may be seen. In this case the user of the system is a hypothetical provider of sports information. In such a case a caller of the service would call in, probably utilizing an 800 number to obtain the latest sports information, with automatic billing being accomplished through the caller's credit card. Upon receipt of a call the associated IVEC answers with an appropriate greeting and sends a START message to the data base computer, causing the same to open a line table record to track the progress of the call. Thereafter, TRIESB and TRIESA are both set to one, as a lesser number of tries is appropriate for credit card purposes than for an automatic order entry system. Thereafter, the IVEC system provides a verbal credit card number prompt to the caller, which then enters his credit card number through his touch tone keypad. If the caller does not enter enough digits within the allowed time, TRIESA is tested and then decremented, and the credit card number prompt repeated, with the second attempt to enter enough digits within the allotted time resulting in the call being terminated. Assuming that enough digits have been received, a credit card number signal CCIS is sent from the IVEC to the database computer. If the credit card number is not in the database, the database computer sends a GETDATE signal back to the IVEC, which then resets TRIESA to one and provides a verbal credit card expiration date prompt to the caller, who then enters the expiration date given on the credit card through the touch tone keypad. Again, if the right number of digits is not entered by a least a second try, the call is terminated.

On receipt of the proper number of digits, a DATEIS signal is sent from the IVEC to the database computer, which then proceeds with obtaining credit card authorization from the credit card service over either a phone line or dedicated line through line interface 86 (see FIG. 2). Assuming authorization is obtained, the credit card number and expiration date are added to the database, and a GO signal given by the database computer to the respective IVEC to provide the sports information to the caller in verbal form, and to terminate the call at the conclusion thereof. Upon a subsequent call under the same credit card number prior to the expiration date thereof, the database computer will locate the credit card number from the database in response to the CCIS signal from the IVEC, and immediately proceed with calling the credit card service to obtain authorization, as the expiration date of the credit card will already be in the database. Again, assuming authorization is approved, the IVEC message is initiated by the GO signal from the database computer, with the call being terminated at the conclusion of the informational message. Typically the actual charge itself would be done later to save time during the busy periods. Alternatively, if the card and date are in the database, the card may be presumed good. In this case, a message GO is returned immediately, without communicating with the service bureau. Charges would then be processed later, perhaps in a batch mode during non-busy periods.

In all cases of termination, whether upon completion of a call, or termination of the call for failure to enter the proper information, etc., a termination routine is executed by the database computer. This routine merely determines whether the call had progressed to successful credit card verification. If so, the database computer computes the charge to the caller, which depends upon time and chargeability of the call, and the charge to the information provider, one for a billable call and one for unbillable calls, and stores the information on disk, preferably occasionally printing out the same for hardcopy backup. Upon completion of this, or alternatively upon determination that credit card authorization had not been obtained, the line table record is closed. Also in all cases of termination, whether initiated by the caller by hanging up, by an IVEC or a response to a STOP message from the data base computer, the IVEC will respond by terminating the call and sending a TERM message to the data base computer. In cases where the termination was initiated by a STOP message from the data base computer, the TERM message is not needed, but is still provided for response consistency.

In the event the credit card service is called for authorization and the authorization is not given, a STOP signal is given by the database computer to the IVEC, which tests TRIESB, terminating the call if the number of tries has been exceeded, or decrementing TRIESB, resetting TRIESA and proceeding with the credit card number prompt, etc., if the number of allotted tries has not been exceeded. The net result, of course, is that not only is an automatic information service provided, but automatic billing therefor is provided without the use of 976 numbers currently used for that purpose, thereby allowing the use of either conventional phone lines or preferably 800 number phone lines, so that a single informational base may be maintained to service calls throughout the country, thereby grossly reducing equipment costs and maintenance and management problems, and grossly simplifying the updating of the informational base to keep the same as current as possible, as will be required for a viable service, by requiring the update at only a single central location. Of course, one day the carriers may be able to perform per-minute billing automatically. An example of this is the proposed AT&T nationwide "700" service, which will work just like the regional "976" works at the present time. The present invention system could use "700" as easily as "800". This would probably obviate the need for credit card charge for simple voice services, but automatic credit card verification would still be required for order entry and more complex private voice services Also, as previously mentioned and as shown in FIG. 2, any of the lines from the digital cross connect circuit 70 may be coupled to other digital voice or data equipment or any of the output lines of the channel banks 72, may be connected to other voice equipment. An example of such use is in voice mail systems, now well known in the art. Such systems generally allow a caller to call in and leave a verbal message for another person identified by an identification code, phone number, etc., or alternatively, to call in and identify himself by code or phone number to receive his own messages previously left by others. In such an application, the answering IVEC would qualify and bill the caller as in other application described herein, and then the digital cross connect circuit 70, at the command of the data base computer 76, would transfer the call to the voice mail equipment to handle the call in the normal voice mail system manner. The data base computer in such case would periodically inquire the status of the digital cross connect circuit over the serial link to see if the call had terminated, digital cross connect circuits providing idle/busy status information for established connections upon inquiry via its serial port. Upon detection of the call being completed, the data base computer would cause the digital cross connect circuit to reconnect the line to an IVEC and would itself complete the billing process.

Also, it should be noted in the exemplary embodiments described herein, that specific identifications of the number of lines etc., has only been done for exemplary purposes. For instance, in the case of the T1 lines, it should be noted that T1 compression devices are available which permit the multiplexing of 48 or 96 conversations on a single T1 line pair. Accordingly, the 24 channel mode is clearly exemplary only though normally depending upon the capability of the digital cross connect circuit the line compression must be undone before being provided to the digital cross connect circuit, as most, if not all cross connect circuits cannot handle the multiplexed T1 lines.

Finally, in various other applications, it may be desired to use the conferencing capability inherent in the IVEC system. For this purpose conferencing boards 52 (See FIG. 1) will be included in the IVEC systems of FIG. 2, with the applicable telephone lines from the channel banks 72 being connected in parallel to both one or more X4 boards and the conferencing (C4) boards of the applicable IVEC system. Such a connection allows the IVEC system to answer an incoming call to the X4 board as desired, and to switch the call to the conferencing board after any preliminaries have been completed in accordance with the procedure set up for use of the conferencing capability. Of course the conferencing boards of the IVEC systems themselves have the ability to not only detect a ring signal, but to also seize an incoming line as well as to detect loop current to determine when the party at the other end has hung up. Thus, the conferencing boards will detect when a caller hangs up and provide a bit to the control and status port 58 (See FIG. 1) for periodic testing through the computer 20 to release the line for subsequent calls and to determine the length of the conference call for billing purposes.

There has been described herein a new and unique information network and method having create versatility in a myriad of applications on a national basis. While two exemplary uses of the system have been given, specifically the information provider and automatic order entry, such uses are merely exemplary and are by no means limiting, as the broad capabilities of the IVEC systems to themselves basically manage the progress of a call and together with the support and subsidiary functions which may be performed by the database computer, including functions utilizing communication capabilities over other phone or dedicated lines and/or requiring operator intervention, allows the advantageous use of the system in many environments. Thus, while the present invention has been disclosed and described with respect to a preferred environment thereof and in connection with two exemplary uses thereof, it will be understood by those skilled in the art that various changes in form and detail may be made therein without departing from the spirit and scope thereof.

What is claimed:

1. Apparatus for use in an information network comprising:
   (a) at least one voice message system having:
      coupling means for coupling to at least one telephone line, said coupling means having interface means for coupling analog signals to and from said telephone line, converter means coupled to said interface means for converting speech information in digital form to analog speech for coupling to said telephone line, and supervision control signal means for controllably coupling touch tone signals and a line load to said telephone line and detecting touch tone signals and loop current on said telephone line, and
      digital control means coupled to said coupling means, said digital control means including digital data storage means for storing speech information in digital form and for storing an operating program, and digital processing means responsive to said operating program to receive signals from and provide signals to said coupling means and to provide speech information in digital form to said converter means, whereby said voice message system may answer incoming calls with verbal prompts and receive information from callers in touch tone coded form, said voice message system having voice message system communication means for communicating with a data base computer means; and (b) a data base computer means having a data base computer communication means coupled to said voice message system communication means for receiving information relating to calls received by said voice message system and storing the same in a predetermined format, said data base computer means further includes means for coupling to a line coupled to a credit verification service, said data base computer means being a means for automatic communication with the credit verification service to verify credit for a caller for which credit information is not already stored in said data base computer means.

2. The apparatus of claim 1 wherein said data base computer means is a means for storing information with respect to specific prospective callers, and for providing at least part of the information to said voice message system, said voice message system being a means for proceeding with a call in accordance with said operating program responsive in part to information with respect to a caller requested of and received from said data base computer means.

3. The apparatus of claim 2 wherein said data base computer means is a means for storing credit information with respect to specific prospective callers.

4. The apparatus of claim 1 further comprised of live operator terminal means coupled to said data base computer means, said data base computer means being a means for switching a call on said at least one telephone line from said voice message system to said live operator terminal means in response to a request for live operator assistance from a caller received by said voice message system in touch tone form.

5. The apparatus of claim 4 wherein said data base computer means is also a means for providing information relevant to a call to said live operator terminal means when switching a call thereto 6. The apparatus of claim 4 wherein said coupling means includes at least one digital cross-connect circuit for coupling to at least one multiplexed telephone line, and wherein said data base computer means is a means for switching a call by control of said digital cross-connect circuit.

7. The apparatus of claim 1 further comprised of live operator terminal means coupled to said data base computer means, said data base computer means being a means for switching a call on said at least one telephone line from said voice message system to said live operator terminal means in response to a failure of a caller to respond in touch tone form to verbal prompts from said voice message system.

8. The apparatus of claim 1 wherein said data base computer means further includes coupling means for coupling to a telephone line, said data base computer means being a means for receiving calls through said last named coupling means and for providing selected information stored in said data base computer means in response thereto.

9. Apparatus for use in an information network comprising:

(a) a plurality of voice message systems, each having coupling means for coupling to at least one telephone line, said coupling means having interface means for coupling analog signals to and from said telephone line, converter means coupled to said interface means for converting speech information in digital form to analog speech for coupling to said telephone line, and supervision control signal means for controllably coupling touch tone signals and a line load to said telephone line and detecting touch tone signals and loop current on said telephone line, and digital control means coupled to said coupling means, said digital control means including digital data storage means for storing speech information in digital form and for storing an operating program, and digital processing means responsive to said operating program to receive signals from and provide signals to said coupling means and to provide speech information in digital form to said converting means, whereby said voice message system may answer incoming calls with verbal prompts and receive information from callers in touch tone coded form, said voice message system having voice message system communication means for communicating with a data base computer means; and (b) a data base computer means having a data base computer communication means coupled to each of said voice message system communication means of said voice message systems for receiving information relating to calls received by said voice message systems and storing the same in a predetermined format, said data base computer means further includes means for coupling to a line coupled to a credit verification service, said data base computer means being a means for automatic communication with the credit verification service to verify credit for a caller for which credit information is not already stored in said data base computer means.

10. The apparatus of claim 9 wherein said data base computer means is a means for storing information with respect to specific prospective callers, and for providing at least part of the information to said voice message systems, each of said voice message systems being a means for proceeding with a call in accordance with said operating program responsive in part to information with respect to a caller requested of and received from said data base computer means.

11. The apparatus of claim 10 wherein said data base computer means is a means for storing credit information with respect to specific prospective callers.

12. The apparatus of claim 9 further comprised of live operator terminal means coupled to said data base computer means, said data base computer means being a means for switching a call on said at least one telephone line from any of said voice message systems to said live operator terminal means in response to a request for live operator assistance from a caller received by said voice message system in touch tone form.

13. The apparatus of claim 12 wherein said data base computer means is also a means for providing information relevant to a call to said live operator terminal means when switching a call thereto.

14. The apparatus of claim 12 wherein said coupling means includes at least one digital cross-connect circuit for coupling to at least one multiplexed telephone line, and wherein said data base computer means is a means for switching a call by control of said digital cross-connect circuit.

15. The apparatus of claim 9 further comprised of live operator terminal means coupled to said data base computer means, said data base computer means being a means for switching a call on said at least one telephone line from said voice message system to said live operator terminal means in response to a failure of a caller to respond in touch tone form to verbal prompts from said voice message system.

16. The apparatus of claim 9 wherein said data base computer means further includes coupling means for coupling to a telephone line, said data base computer means being a means for receiving calls through said last named coupling means and for providing selected information stored in said data base computer means in response thereto.

17. A method of communication comprising the steps of
(a) providing at least one voice message system coupled to at least one phone line for receiving incoming calls on said at least one phone line, providing verbal prompts to the callers from predetermined messages stored in digitized form, and for receiving information from callers over said at least one phone line in touch tone coded form in response to the verbal prompts; and
(b) providing a data base computer coupled to the at least one voice message system for receiving information from the voice message system relating to each call and storing the same in a form organized at least in part by reference to each respective caller, said data base computer being coupled to a line to a credit verification service and automatically communicating with the credit verification service for credit verification purposes for callers for which such information is not already stored in the data base computer.

18. The method of claim 17 wherein the data base computer maintains credit information regarding a plurality of possible callers, and wherein the at least one voice message system proceeds with a call in accordance with credit information received from the data base computer.

19. The method of claim 17 further including the steps of:
(c) providing a live operator terminal;
(d) coupling the at least one voice message system to at least one phone line through a switch; and
(e) switching an incoming call on said at least one phone line to the live operator terminal in response to a caller reply to a verbal live operator prompt from the voice message system.

20. The method of claim 19 further including the steps of providing information relevant to a call to the live operator terminal by the data base computer when switching a call thereto.

21. A method of communication comprising the steps of
(a) providing a plurality of voice message systems, each coupled to at least one phone line for receiving incoming calls on said at least one phone line, providing verbal prompts to the callers from predetermined messages stored in digitized form, and for receiving information from callers over said at least one phone line in touch tone coded form in response to the verbal prompts; and
(b) providing a data base computer coupled to each of the voice message systems for receiving information from the voice message systems relating to each call and storing the same in a form organized at least in part by reference to each respective caller, wherein the data base computer is coupled to a line to credit verification service, and wherein the data base computer automatically communicates with the credit verification service for credit verification purposes for callers for which such information is not already stored in the data base computer.

22. The method of claim 21 wherein the data base computer maintains credit information regarding a plurality of possible callers, and wherein the voice message systems each proceed with a call in accordance with credit information received from the data base computer.

23. The method of claim 21 further including the steps of:
(c) providing a live operator terminal;
(d) coupling the voice message systems, each to a respective phone line through a switch; and
(e) switching an incoming call on the respective phone line to the liver operator terminal in response to a caller reply to a verbal prompt from the respective one of the voice message systems.

24. The method of claim 23 further including the steps of providing information relevant to call to the live operator terminal by the data base computer when switching a call thereto.

25. Apparatus for use in an information network comprising:
(a) at least one voice message system having:
coupling means for coupling to at least one telephone line, said coupling means having interface means for coupling analog signals to and from said telephone line, converter means coupled to said interface means for converting speech information in digital form to analog speech for coupling to said telephone line, and supervision control signal means for controllably coupling touch tone signals and a line load to said telephone line and detecting touch tone signals and loop current on said telephone line, and
digital control means coupled to said coupling means, said digital control means including digital data storage means for storing speech information in digital form and for storing an operating program, and digital processing means responsive to said operating program to receive signals from and provide signals to said coupling means and to provide speech information in digital form to said converter means, whereby said voice message system may answer incoming calls with verbal prompts and receive information from callers in touch tone coded form, said voice message system having voice message system communication means for communicating with a data base computer means; and
(b) a data base computer means having a data base computer communication means coupled to said voice message system communication means for receiving information relating to calls received by said voice message system and storing the same in a predetermined format, said data base computer means having a means for storing credit information with respect to specific prospective callers, and for providing at least part of the information to said voice message system, said voice message system being a means for proceeding with a call in accordance with said operating program responsive in part to information with respect to a caller requested of and received from said data base computer means, said data base computer means further including means for coupling to a line coupled to a credit verification service, said data base computer means being a means for automatic communication with the credit verification service to verify credit for a caller for which credit information is not already stored in said data base computer means.

26. The apparatus of claim 25 wherein said for coupling to a line coupled to a credit verification service is a means for coupling to a telephone line coupled to said credit verification service.

27. Apparatus for use in an information network comprising:
(a) a plurality of voice message systems, each having;
coupling means for coupling to at least one telephone line, said coupling means having interface means for coupling analog signals to and from said telephone line, converter means coupled to said interface means for converting speech information in digital form to analog speech for coupling to said telephone line, and supervision control signal means for controllably coupling touch tone signals and a line load to said telephone line and detecting touch tone signals and loop current on said telephone line, and
digital control means coupled to said coupling means, said digital control means including digital data storage means for storing speech information in digital form and for storing an operating program, and digital processing means responsive to said operating program to receive signals from and provide signals to said coupling means and to provide speech information in digital form to said converter means, whereby said voice message system may answer incoming calls with verbal prompts and receive information from callers in touch tone coded form, said voice message system having voice message system communication means for communicating with a data base computer means; and
(b) a data base computer means having a data base computer communication means coupled to each of said voice message system communication means of said voice message systems for receiving information relating to calls received by said voice message system and storing the same in a predetermined format, said data base computer means having a means for storing credit information with respect to specific prospective callers, and for providing at least part of the information to said voice message systems, each of said voice message systems being a means for proceeding with a call in accordance with said operating program responsive in part to information with respect to a caller requested of and received from said data base computer means, said data base computer means further includes means for coupling to a line coupled to a credit verification service, said data base computer means being a means for automatic communication with the credit verification service to verify credit for a caller for which credit information is not already stored in said data base computer means.

28. The apparatus of claim 27 wherein said means for coupling to a line coupled to a credit verification service is a means for coupling to a telephone line coupled to said credit verification service.

29. A method of communication comprising the steps of
(a) providing at least one voice message system coupled to a least one phone line for receiving incoming calls on said at least one phone line, providing verbal prompts to the callers from predetermined messages stored in digitized form, and for receiving information from callers over said at least one phone line in touch tone coded form in response to the verbal prompts; and
(b) providing a data base computer coupled to the at least one voice message system for receiving information from the voice message system relating to each call and storing the same in a form having an identifiable relationship to caller, the data base computer also maintaining credit information regarding a plurality a possible callers wherein the at least one voice message system proceeds with a call in accordance with credit information received from the data base computer, the data base computer further being coupled to a line to a credit verification service, and wherein the data base computer automatically communicates with the credit verification service for credit verification purposes for callers for which each information is not already stored in the data base computer.

30. The method of communication comprising the steps of
(a) providing at least one voice message system coupled to at least one phone line for receiving incoming calls on said at least one phone line, providing verbal prompts to the callers from predetermined messages stored in digitized form, and for receiving information from callers over said at least one phone line in touch tone coded form in response to the verbal prompts; and
(b) providing a data base computer coupled to the at least one voice message system for receiving information from the voice message system relating to each call and storing the same in a form having an identifiable relationship to each caller, the data base computer further being coupled to a line to a credit verification service, and wherein the data base computer automatically communicates with the credit verification service for credit verification purposes.

31. The method of claim 30 wherein the data base computer is coupled to a telephone line to a credit verification service for credit verification purposes.

32. The method of claim 30 wherein the data base computer is coupled to a dedicated line to a credit verification service for credit verification purposes.

33. The method of claim 29 wherein the data base computer communicates with the credit verification service when the credit information for a caller is not already stored in the data base computer.

34. The method of claim 33 wherein the information stored in the data bus computer is updated by information received from the credit verification service.

35. The method of claim 29 wherein the progress of a call is effected by the credit information regarding a caller.

36. The method of claim 30 wherein after authorization of credit, the voice message system provides information to the caller in verbal form based on one or more messages stored therein in digitized form.

37. The method of claim 30 wherein after authorization of credit, the voice message system causes the switching of the call to a voice mail system.

38. The method of claim 30 wherein after authorization of credit, the voice message system causes the switching of the call to one of a plurality of telephone lines coupled for conferencing purposes.

39. The method of claim 30 further comprising providing verbal prompts to a caller for encouraging the caller to enter an order in touch tone form, and receiving in touch tone form and detecting and storing the order so detected.

40. The method of claim 39 further comprising receiving a request for operator assistance in touch tone form and transferring the call to a live operator in response thereto.

41. The method of claim 30 further comprising receiving a request for operator assistance in touch tone form and transferring the call to a live operator in response thereto.

42. A method of communication comprising the steps of
  (a) providing a plurality of voice message systems, each coupled to at least one phone line for receiving incoming calls on said at least one phone line, providing verbal prompts to the callers from predetermined messages stored in digitized form, and for receiving information from callers over said at least one phone line in touch tone coded form in response to the verbal prompts; and
  (b) providing a data base computer coupled to each of the voice message systems for receiving information from the voice message systems relating to each call and storing the same in a form having an identifiable relationship to the respective caller, the data base computer also maintaining credit information regarding a plurality of possible callers wherein the voice message systems each proceed with a call in accordance with credit information received from the data base computer, the data base computer further being coupled to a line to a credit verification service, and wherein the data base computer automatically communicates with the credit verification service for credit verification purposes for callers for which such information is not already stored in the data base computer.

43. Apparatus for use in an information network comprising:
  (a) at least one voice message system having:
    coupling means for coupling to at least one telephone line, said coupling means having interface means for coupling analog signals to and from said telephone line, converter means coupled to said interface means for converting speech information in digital form to analog speech for coupling to said telephone line, and supervision control signal means for controllably coupling a line load to said telephone line and detecting touch tone signals on said telephone line, and
    digital control means coupled to said coupling means, said digital control means including digital data storage means for storing speech information in digital form and for storing an operating program, and digital processing means responsive to said operating program to receive signals from and provide signals to said coupling means and to provide speech information in digital form to said converter means, whereby said voice message system may answer incoming calls with verbal prompts and receive information from callers in touch tone coded form; and
  (b) communication means coupled to said voice message system for coupling to a line coupled to a banking card service for automatic communication with the banking card service to authorize credit for caller as a preliminary step to said voice message system proceeding with the call.

44. The apparatus of claim 43 wherein said voice message system is a system for providing information to a caller after completion of credit authorization.

45. The apparatus of claim 43 further including switching means to switch an incoming call to another telephone line, whereby after credit authorization, an incoming call may be transferred to a voice mail system.

46. The apparatus of claim 43 further including conference means whereby two or more telephone lines may be coupled together so that callers on said lines will be conferenced together, and switching means to switch an incoming call to another telephone line, whereby after credit authorization an incoming call may be transferred to one of the telephone lines of said conference means.

47. A method of dispensing information for a charge comprising the steps of:
  (a) providing at least one voice message system coupled to at least one phone line for automatically receiving incoming calls on said at least one phone line, providing verbal prompts to the callers from predetermined messages stored in digitized form, and for receiving information from callers over said at least one phone line in touch tone coded form in response to the verbal prompts, the voice message system having the capability of communication with a banking card service;
  (b) receiving incoming calls by the voice message system and providing verbal prompts to each caller to encourage the same to enter the caller's banking card information by way of the touch tone keyboard;
  (c) receiving in touch tone form and detecting the banking card information from a caller;
  (d) automatically communicating with a banking card service to authorize credit in accordance with the banking card information; and
  (e) providing the information to be dispensed to the caller in verbal form based on one or more messages stored in the voice message system in digitized form;
  (f) all of the foregoing steps (b) through (e) being accomplished without operator intervention.

48. The method of claim 47 wherein the voice message system is coupled to a telephone line to a credit verification service for credit verification purposes.

49. The method of claim 47 wherein the voice message system is coupled to a dedicated line to a credit verification service for credit verification purposes.

50. A method of communication comprising the steps of:
  (a) providing at least one voice message system coupled to at least one phone line for automatically receiving incoming calls on said at least one phone line, providing verbal prompts to the callers from predetermined messages stored in digitized form, and for receiving information from callers over said at least one phone line in touch tone coded form in response to the verbal prompts, the voice message system having the capability of communication with a banking card service;

(b) receiving incoming calls by the voice message system and providing verbal prompts to each caller to encourage the same to enter the caller's banking card information by way of the touch tone keyboard;

(c) receiving in touch tone form and detecting the banking card information from a caller; '(d) automatically communicating with the banking card service to authorize credit in accordance with the banking card information; and (e) switching the respective one of the calls to a voice mail system;

(f) all of the foregoing steps (b) through (e) being accomplished without operator intervention.

51. A method of communication comprising the steps of:

(a) providing at least one voice message system coupled to at least one phone line for automatically receiving incoming calls on said at least one phone line, providing verbal prompts to the callers from predetermined messages stored in digitized form, and for receiving information from callers over said at least one phone line in touch tone coded form in response to the verbal prompts, the voice message system having the capability of communication with a banking card service;

(b) receiving incoming calls by the voice message system and providing verbal prompts to each caller to encourage the same to enter the caller's banking card information by way of the touch tone keyboard;

(c) receiving in touch tone form and detecting the banking card information from a caller;

(d) automatically communicating with a banking card service to authorize credit in accordance with the banking card information; and (e) switching the respective one of the calls to one of a plurality of telephone lines coupled for conferencing purposes;

(f) all of the foregoing steps (b) through (e) being accomplished without operator intervention.

52. A method of communication comprising the steps of:

(a) providing at least one voice message system coupled to at least one phone line for automatically receiving incoming calls on said at least one phone line, providing verbal prompts to the callers from predetermined messages stored in digitized forms, and for receiving information from callers over said at least one phone line in touch tone coded form in response to the verbal prompts, the voice message system having the capability of communication with a banking card service;

(b) receiving incoming calls by the voice message system and providing verbal prompts to each caller to encourage the same to enter the caller's banking card information by way of the touch tone keyboard;

(c) receiving in touch tone form and detecting the banking card information from a caller; and (d) automatically communicating with a banking card service to authorize credit in accordance with the banking card information when credit information for a caller is not otherwise automatically accessible to said at least one voice message system;

(e) all of the foregoing steps (b) through (d) being accomplished without operator intervention.

53. The method of claim 42 or 52 further comprised of the steps of providing verbal prompts to a caller for encouraging the caller to enter an order in touch tone form, and receiving in touch tone form and detecting and storing the order so detected.

54. The method of claim 53 further comprised of the step of receiving a request for operator assistance in touch tone form and transferring the respective one of the calls to a live operator in response thereto.

55. The method of claim 52 wherein credit information on callers is maintained in a data base directly accessible to said at least one voice message system, and wherein the data base may be updated with new information on communication with a banking card service.

56. The method of claim 55 wherein the progress of a particular call is affected by the credit information on a caller.

* * * * *

UNITED STATES PATENT AND TRADEMARK OFFICE
CERTIFICATE OF CORRECTION

PATENT NO. : 4,908,850
DATED : 3/13/90
INVENTOR(S) : Masson et al.

It is certified that error in the above-identified patent and that said Letters Patent is hereby corrected as shown below:

| | | |
|---|---|---|
| col. 02, line 03 | delete "y" | insert --by-- |
| col. 04, line 12 | delete "L" | |
| col. 18, line 62 | delete "bus" | insert --base-- |

Signed and Sealed this

Thirty-first Day of March, 1992

Attest:

HARRY F. MANBECK, JR.

*Attesting Officer*  *Commissioner of Patents and Trademarks*

REEXAMINATION CERTIFICATE (2468th)
United States Patent [19]
Masson et al.

[11] B1 4,908,850
[45] Certificate Issued Feb. 7, 1995

[54] VOICE SERVICES NETWORK WITH AUTOMATED BILLING

[75] Inventors: Ronald K. Masson, Topanga; Michael W. Edelson, Simi Valley, both of Calif.

[73] Assignee: American Communications & Engineering, Inc., Simi Valley, Calif.

Reexamination Request:
No. 90/003,109, Jun. 29, 1993

Reexamination Certificate for:
Patent No.: 4,908,850
Issued: Mar. 13, 1990
Appl. No.: 142,676
Filed: Jan. 11, 1988

Certificate of Correction issued Mar. 31, 1992.

[51] Int. Cl.$^6$ .............. H04M 3/50; H04M 3/56; H04M 3/58
[52] U.S. Cl. .................. 379/88; 370/62; 379/89; 379/91; 379/204; 379/212
[58] Field of Search ............ 379/88, 89, 67, 84, 379/77, 91, 97, 92, 204, 212; 370/62

[56] References Cited
U.S. PATENT DOCUMENTS

| | | | |
|---|---|---|---|
| 2,902,541 | 9/1959 | Singleton | 379/106 |
| 3,920,908 | 11/1975 | Kraus | 379/121 |
| 4,071,698 | 1/1978 | Barger, Jr. et al. | 379/84 |
| 4,162,377 | 7/1979 | Mearns | 379/127 |
| 4,191,860 | 3/1980 | Weber | 379/115 |
| 4,567,359 | 1/1986 | Lockwood | 235/381 |
| 4,792,968 | 12/1988 | Katz | 379/92 |
| 4,797,911 | 1/1989 | Szlam et al. | 379/67 |
| 4,797,913 | 1/1989 | Kaplan et al. | 379/91 |
| 4,845,739 | 7/1989 | Katz | 379/92 |
| 4,847,890 | 7/1989 | Solomon et al. | 379/67 |
| 4,930,150 | 5/1990 | Katz | 379/93 |
| 4,996,705 | 2/1991 | Entenmann et al. | 379/91 |

OTHER PUBLICATIONS

"Telephonic Voice Synthesis Systems", A. S. Yatagai, *Telecommunications*, Aug. 1985, pp. 56h–56l and 68.

"Conversant 1 Voice System: Architecture and Applications", R. J. Perdue et al, *AT&T Tech. Journal*, vol. 65, No. 5, Sep./Oct. 1986, pp. 34–47.

Andrew J. Waite, "Getting Personal With New Technologies For Telemarketers," *DM News*, Feb. 15, 1987 at 50.

"Shopping Via A Network Is No Longer Just Talk," *Data Communications*, Aug. 1981 at 43.

"Growth–Oriented Systems; Restaurant Technology," *Nation's Restaurant News Newspaper*, Jul. 1, 1985 at 51.

"Let Your Fingers Do The Tapping And The Computer The Talking," *Modern Office Tech.*, May 1984 at 80.

"American Software Unveils System For IBM Mainframes," *Computerworld*, Mar. 26, 1984 at 59.

"Business Units Get Order Entry," *Computerworld*, Jul. 12, 1982 at 36.

*Primary Examiner*—Thomas W. Brown

[57] ABSTRACT

An information network and method for providing a nationwide audio text network, including electronic billing, useful for a wide variety of applications is disclosed. The information network utilizes a telephone message delivery system coupled to phone lines, typically the "800" area code common carrier lines, to receive incoming calls, to interactively respond thereto as controlled by a computer and to communicate with the computer to provide information to and obtain information from a database maintained by the computer. In addition to being coupled to the telephone message delivery system, the computer is typically also coupled to one or more dedicated or dial up lines so as to be capable of obtaining electronic credit card authorization or changes, and is further coupled so as to control the routing of an incoming call, to redirect the call to a live operator or to other equipment, or to outgoing lines to any desired destination.

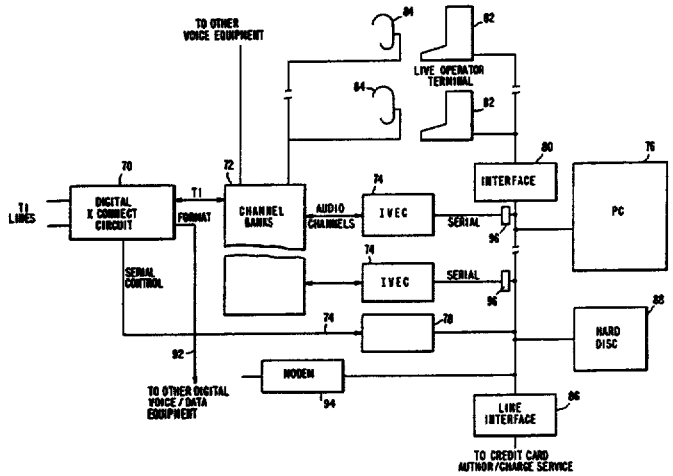

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer part of the patent; matter printed in italics indicates additions made to the patent.

AS A RESULT OF REEXAMINATION, IT HAS BEEN DETERMINED THAT:

Claims 1-56 are cancelled.

* * * * *